US011240718B2

(12) United States Patent
Won et al.

(10) Patent No.: US 11,240,718 B2
(45) Date of Patent: *Feb. 1, 2022

(54) METHOD AND APPARATUS FOR INTER-RADIO ACCESS NETWORK MOBILITY

(71) Applicant: Samsung Electronics Co., Ltd., Suwon-si (KR)

(72) Inventors: Sung-Hwan Won, Suwon-si (KR); Hwa-Jin Cha, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 297 days.

This patent is subject to a terminal disclaimer.

(21) Appl. No.: 16/540,555

(22) Filed: Aug. 14, 2019

(65) Prior Publication Data
US 2019/0373522 A1 Dec. 5, 2019

Related U.S. Application Data

(63) Continuation of application No. 14/707,597, filed on May 8, 2015, now Pat. No. 10,390,266.

(30) Foreign Application Priority Data

May 8, 2014 (KR) ........................ 10-2014-0054815

(51) Int. Cl.
*H04W 36/00* (2009.01)
*H04W 88/06* (2009.01)
(Continued)

(52) U.S. Cl.
CPC ..... *H04W 36/00837* (2018.08); *H04W 24/10* (2013.01); *H04W 36/08* (2013.01); *H04W 36/30* (2013.01); *H04W 88/06* (2013.01)

(58) Field of Classification Search
CPC ..... H04W 88/06; H04W 36/14; H04W 24/10; H04W 36/0088; H04W 36/0083; H04W 36/0022; H04W 36/08; H04W 48/18
See application file for complete search history.

(56) References Cited

U.S. PATENT DOCUMENTS 9,801,104 B2 10/2017 Won et al.
2010/0130211 A1 5/2010 Bae et al.
(Continued)

FOREIGN PATENT DOCUMENTS

KR 10-2010-0058311 A 6/2010
KR 10-2010-0083236 A 7/2010
(Continued)

OTHER PUBLICATIONS

"3rd Generation Partnership Project; Technical Specification Group Radio Access Network; Evolved Universal Terrestrial Radio Access Network (E-UTRAN); X2 application protocol (X2AP) (Release 12)", 3GPP Standard 3GPP TS 36.423, vol. RAN WG3, No. V12.1.0, Mar. 17, 2014, pp. 1-144, XP050769903.
(Continued)

*Primary Examiner* — Asad M Nawaz
*Assistant Examiner* — Najeeb Ansari
(74) *Attorney, Agent, or Firm* — Jefferson IP Law, LLP

(57) ABSTRACT

The present disclosure relates to a method and apparatus for optimizing mobility robustness by controlling an inter-Radio Access Technology (inter-RAT) factor. A method for supporting inter-Radio Access Network (RAN) mobility by a source Base Station (BS) in a wireless communication system includes transmitting a handover request message to a target BS, receiving a RAN information request message including a measurement report from the target BS in response to the handover request message, and determining to amend a mobility setting, if it is determined that an
(Continued)

unnecessary handover has occurred based on the RAN information request message. The handover request message includes at least one of a Tracking Area Identifier (TAI) of a tracking area to which the source BS belongs, a global BS Identifier (ID), and an E-UTRAN (Evolved-UMTS (Universal Mobile Telecommunication System) Terrestrial Radio Access Network) Cell Global ID (ECGI).

16 Claims, 6 Drawing Sheets

(51) Int. Cl.
*H04W 36/30* (2009.01)
*H04W 36/08* (2009.01)
*H04W 24/10* (2009.01)

(56) References Cited

U.S. PATENT DOCUMENTS

| | | |
|---|---|---|
| 2010/0178922 A1 | 7/2010 | Han et al. |
| 2011/0044285 A1 | 2/2011 | Jang et al. |
| 2012/0190368 A1 | 7/2012 | Zhang et al. |
| 2013/0128795 A1 | 5/2013 | Gao et al. |
| 2014/0099940 A1 | 4/2014 | Kim et al. |
| 2014/0128075 A1 | 5/2014 | Da Silva et al. |
| 2014/0155065 A1 | 6/2014 | Centonza et al. |
| 2014/0179325 A1 | 6/2014 | Xu et al. |
| 2014/0200005 A1 | 7/2014 | Wegmann et al. |
| 2015/0146530 A1 | 5/2015 | Jung et al. |
| 2015/0146561 A1 | 5/2015 | Jung et al. |
| 2015/0358868 A1 | 12/2015 | Wegmann et al. |
| 2015/0382270 A1* | 12/2015 | Kordybach ......... H04L 43/0888 370/331 |
| 2016/0044548 A1 | 2/2016 | Choi et al. |
| 2016/0212775 A1 | 7/2016 | Xu et al. |
| 2017/0181153 A1* | 6/2017 | Choi ................. H04W 72/085 |

FOREIGN PATENT DOCUMENTS

| | | |
|---|---|---|
| KR | 10-2011-0020398 A | 3/2011 |
| KR | 10-2011-0046218 A | 5/2011 |
| KR | 10-2014-0018776 A | 2/2014 |
| WO | 2010/082763 A2 | 7/2010 |
| WO | 2013/127480 A1 | 9/2013 |

OTHER PUBLICATIONS

"3rd Generation Partnership Project; Technical Specification Group Radio Access Network; Evolved Universal Terrestrial Radio Access Network (E-UTRAN); S1 Application Protocol (S1AP) (Release 12)", 3GPP Standard 3GPP TS 36.413, vol. RAN WG3, No. V12.1.0., Mar. 17, 2014, pp. 1-285, XP050769900.
"3rd Generation Partnership Project; Technical Specification Group Radio Access Network; UTRAN Iu interface Radio Access Network Application Part (RANAP) signalling (Release 11)", 3GPP Standard; 3GPP TS 25.413, vol. RAN WG3, No. V11.6.0, Mar. 2014.
Indian Office Action dated Sep. 9, 2019, issued in Indian Patent Application No. 3001/KOLNP/2015.
European Summons to attend Oral proceedings dated Nov. 11, 2019, issued in European Application No. 15789153.2.
Alcatel-Lucent, Nokia Networks, Missing source eNB RIM routing address for unnecessary IRAT HO, 3GPP TSG-GERAN Meeting #64, GP-140958, Nov. 17, 2014, San-Francisco, USA.
Alcatel-Lucent, Nokia Networks, Missing source eNB RIM routing address for unnecessary IRAT HO, 3GPP TSG-GERAN Meeting #64, GP-140936, Nov. 17, 2014, San-Francisco, USA.
Telecom Italia et al.; Introduction of UE History Information in FDD HSPA evolution; 3GPP TSG RAN WG3 Meeting #59bis; R3-080773; Mar. 3-31, 2008; Shenzhen, CN.
3GPP; 3rd Generation Partnership Project; Technical Specification Group Radio Access Network; Evolved Universal Terrestrial Radio Access Network (E-UTRAN); X2 application protocol (X2AP) (Release 8); 3GPP TS 36.423; V8.9.0; Mar. 2010; Valbonne, FR.
Nokia Siemens Networks et al.; Addition of HO cause value to the UE history information in RANAP; 3GPP TSG-RAN WG3 Meeting #77; R3-121954; Aug. 13-17, 2012; Qingdao, P.R.China.
Chinese Office Action dated Mar. 11, 2019, issued in a counterpart Chinese application No. 201580024141.X.

* cited by examiner

METHOD AND APPARATUS FOR INTER-RADIO ACCESS NETWORK MOBILITY

PRIORITY

This application is a continuation application of prior application Ser. No. 14/707,597, filed on May 8, 2015, which claimed priority under 35 U.S.C. § 119(a) to a Korean Patent Application filed in the Korean Intellectual Property Office on May 8, 2014 and assigned Serial No. 10-2014-0054815, the entire disclosure of each of which is incorporated herein by reference.

BACKGROUND OF THE DISCLOSURE

1. Field of the Disclosure

The present disclosure relates to a method and apparatus for supporting mobility by controlling a mobility factor in a wireless communication system.

2. Description of the Related Art

To meet the demand for wireless data traffic having increased since deployment of 4G (4th-Generation) communication systems, efforts have been made to develop an improved 5G (5th-Generation) or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

Wireless communication systems were first developed to provide voice service, while ensuring the mobility of users. The wireless communication systems have been extended to data service beyond voice service. At present, the wireless communication systems provide high-rate data service.

Such a wireless communication system may include at least one Radio Access Network (RAN) and a Core Network (CN). Because each RAN covers a different area, a handover between different RANs may be required. For example, a relatively early developed Enhanced Data rates for GSM Evolution (EDGE) RAN (GERAN, called a $2^{nd}$ Generation (2G) network) may have been deployed across a broad area, whereas a relatively recently developed Evolved-UMTS (Universal Mobile Telecommunication System) Terrestrial Radio Access Network (E-UTRAN, called a Long Term Evolution (LTE) network) may have been deployed over smaller areas. In this case, if a User Equipment (UE) moves out of the coverage of the LTE network during reception of a service from the LTE network, the UE may receive the service from the GERAN. Thus, a handover from the LTE network to the GERAN occurs.

A source Radio Access Point (RAP) determines a handover. Many handover decision methods are available. One of the handover decision methods is that an RAP compares a measurement received from a UE with an internal threshold and if a predetermined condition is satisfied, the RAP determines to perform a handover.

Unless an appropriate mobility setting is performed in a handover-related RAP, an abnormal handover (for example, an untimely handover or an unnecessary handover) may occur. Accordingly, there is a need for effectively performing a mobility setting in a handover-related RAP in a wireless communication system.

SUMMARY

An aspect of the present disclosure is to provide a method and apparatus for supporting inter-Radio Access Technology (RAT) mobility in a wireless communication system.

Another aspect of the present disclosure is to provide a method and apparatus for sensing occurrence of an abnormal handover and supporting mobility using mobility setting information in a wireless communication system.

In accordance with an aspect of the present disclosure, there is provided a method for supporting inter-Radio Access Network (RAN) mobility by a source Base Station (BS) in a wireless communication system. The method includes transmitting a handover request message to a target BS, receiving a RAN information request message including a measurement report from the target BS in response to the handover request message, and determining to amend a mobility setting, if it is determined that an unnecessary handover has occurred based on the RAN information request message. The handover request message includes at least one of a Tracking Area Identifier (TAI) of a tracking area to which the source BS belongs, a global BS Identifier (ID), and an E-UTRAN (Evolved-UMTS (Universal Mobile Telecommunication System) Terrestrial Radio Access Network) Cell Global ID (ECGI).

In accordance with another aspect of the present disclosure, there is provided a method for supporting inter-RAN mobility by a target BS in a wireless communication system. The method includes receiving a handover request message from a source BS, and transmitting to the source BS a RAN information request message including a measurement and indicating occurrence of an unnecessary handover in response to the handover request message. The handover request message includes at least one of a TAI of a tracking area to which the source BS belongs, a global BS ID, and an ECGI.

In accordance with another aspect of the present disclosure, there is provided an apparatus of a source BS for supporting inter-RAN mobility in a wireless communication system. The apparatus includes a transceiver for transmitting a handover request message to a target BS, and receiving a RAN information request message including a measurement report from the target BS in response to the handover request message, and a controller for determining to amend a mobility setting, if it is determined that an unnecessary handover has occurred based on the RAN information request message. The handover request message includes at least one of a TAI of a tracking area to which the source BS belongs, a global BS ID, and an ECGI.

In accordance with another aspect of the present disclosure, there is provided an apparatus of a target BS for supporting inter-RAN mobility in a wireless communication system. The apparatus includes a transceiver for receiving a handover request message from a source BS, and transmitting a RAN information request message to the source BS, and a controller for generating the RAN information request message including a measurement and indicating occurrence of an unnecessary handover in response to the handover request message. The handover request message includes at least one of a TAI of a tracking area to which the source BS belongs, a global BS ID, and an ECGI.

BRIEF DESCRIPTION OF THE DRAWINGS

The above and other aspects, features and advantages of certain exemplary embodiments of the present disclosure will be more apparent from the following description taken in conjunction with the accompanying drawings, in which.

DETAILED DESCRIPTION OF THE EXEMPLARY EMBODIMENTS

Figure 1:
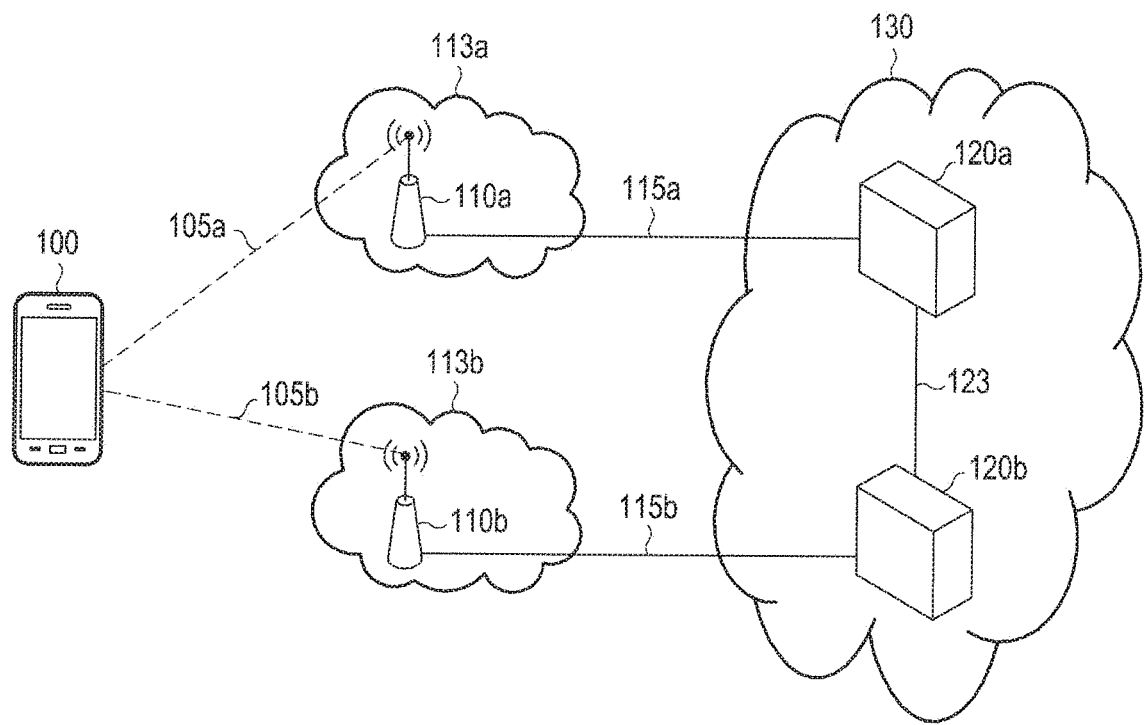
FIG. 1 is a diagram illustrating a configuration of a wireless communication system to which the present disclosure is applied.

With reference to the attached drawings, preferred embodiments of the present disclosure will be described in detail. Like reference numerals denote the same components in the drawings. Known functions and configurations will not be described in detail lest they should obscure the subject matter of the present disclosure.

While the following detailed description is given of embodiments of the present disclosure mainly in the context of a Long Term Evolution (LTE) network and an Evolved Packet Core (EPC) as a Radio Access Network (RAN) and a Core Network (CN), respectively, which are defined by the $3^{rd}$ Generation Partnership Project (3GPP), those skilled in the art will understand that a slight modification can be made to the subject matter of the present disclosure in other communication systems having similar technological backgrounds without departing the scope and spirit of the present disclosure.

FIG. 1 is a diagram illustrating a configuration of a wireless communication system to which the present disclosure is applied.

Referring to FIG. 1, the wireless communication system may include a User Equipment (UE) 100, one or more RANs 113a and 113b, and a CN 130. In the example of FIG. 1, two RANs 113a and 113b exist.

The RANs 113a and 113b are classified depending on their Radio Access Technologies (RATs). Therefore, the terms RAN and RAT are interchangeably used. Major examples of the RANs 113a and 113b include an Enhanced Data rates for GSM Evolution (EDGE) RAN (GERAN), an Evolved-UMTS (Universal Mobile Telecommunication System) Terrestrial Radio Access Network (E-UTRAN, called a 3G network), and an LTE network. Aside from exceptions, the UE 100 may usually establish a connection only with one RAN, for data and/or signaling communication.

Each of the RANs 113a and 113b may include a few components. While each of the RANs 113a and 113b is shown in FIG. 1 as having a single component, for simplicity, it may include a plurality of components. Among the components of the RANs 113a and 113b, RAN components 110a and 110b interacting with the UE 100 may communicate with the UE 100 via radio interfaces 105a and 105b, respectively. The other components of the wireless communication system may be connected mainly wiredly. Each of the RAN components 110a and 110b interacting with the UE 100 may be one of, for example, an evolved Node B (eNB), a Node B (NB), and/or a Radio Network Subsystem (RNS) including an eNB or an NB, a Base Transceiver Station (BTS) or a Base Station Subsystem (BSS) including a BTS, a wireless access point, a home eNB, a home NB, a home eNB GateWay (GW), and an X2 GW. For the convenience of description, the term "RAP" is used to signify at least one of the above examples of the RAN components 110a and 110b or a RAN itself.

Each of the RAPs 110a and 110b may include one or more cells. A cell covers a specific area and the UE 100 is serviced within the coverage of a cell. Herein, the cell is equivalent to a cell of a cellular system and the RAPs 110a and 110b are devices that manage and control the cells. However, the RAPs 110a and 110b and the cells may be used in the same meaning, for the convenience of description in the present disclosure. When an object (for example, an embodiment) is described, the terms cell and RAP may be interchangeably used, for the convenience of description.

The CN 130 may include RAN control elements 120a and 120b. The RAN control elements 120a and 120b are responsible for overall control functionalities including mobility management, authentication, and security. Each of the RAN control elements 120a and 120b may be at least one of, for example, a Mobility Management Entity (MME), a Serving GPRS (General Packet Radio Service) Support Node (SGSN), and a Mobile Switching Center (MSC).

The different RAN control elements 120a and 120b may be connected to the RAPs 110a and 110b of the different RANs 113a and 113b. For example, the eNB 110a of the E-UTRAN 113a may be connected to the MME 120a; and the RNS 110b of the UTRAN 113b may be connected to the SGSN 120b and/or the MSC 120b;

the BSS 110a of the GERAN 113a may be connected to the SGSN 120a and/or the MSC 120a.

In the presence of information to be transmitted between the RAPs 110a and 110b belonging to the different RANs 113a and 113b, the information is transmitted generally through the RAN control element 120a because there is no interface defined between the RAPs 110a and 110b. For example, if the RAP 110a has information to be transmitted to the other RAP 110b, the information may be transmitted through an interface 115a defined between the RAP 110a and the RAN control element 120a, an interface 123 defined between the RAN control element 120a and the other RAN control element 120b, and an interface 115b defined between the RAN control element 120b and the RAP 110b.

[Table 1] and [Table 2] below list the names of the interfaces 115a and 115b and the interface 123 according to the types of terminal ends.

TABLE 1

| RAN control element-RAP | Names of the interfaces 115a and 115b |
| --- | --- |
| MME-eNB | S1-MME |
| SGSN-RNS | Iu-PS |
| MSC-RNS | Iu-CS |
| SGSN-BSS | Gb or Iu-PS |
| MSC-BSS | A or Iu-CS |

TABLE 2

| RAN control element-RAN control element | Name of interface 123 |
| --- | --- |
| MME-MME | S10 |
| MME-SGSN | S3 |
| MME-MSC | SGs or Sv |
| SGSN-SGSN | Gn or S16 |
| SGSN-MSC | Gs or Sv |
| MSC-MSC | E |

Because the different RANs 113a and 113b cover different areas, a handover between the RANs 113a and 113b is required. The source RAP 110a or 110b determines the handover. One of many available handover decision methods is that an RAP compares a measurement received from the UE 100 with its internal threshold and then, if a predetermined condition is satisfied, the RAP determines to perform a handover.

Now, a description will be given of an apparatus and method for sensing an abnormal handover, when the source RAP 110a or 110b determines a handover.

Figure 2:
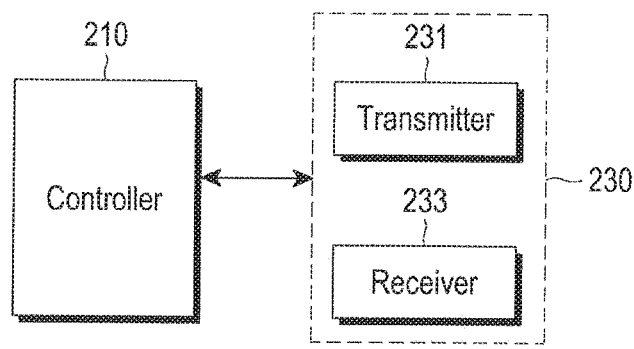
FIG. 2 is a block diagram illustrating each device included in the wireless communication system according to an embodiment of the present disclosure.

FIG. 2 is a block diagram illustrating each device included in the wireless communication system according to an embodiment of the present disclosure.

Each device included in the wireless communication system illustrated in FIG. 1 includes a controller 210, a transmitter 231, and a receiver 233. The transmitter 231 and the receiver 233 may be incorporated into a single unit.

The controller 210 controls operations of the device according to an embodiment of the present disclosure. Particularly, the controller 210 generates a message for a handover in the device and controls the transmitter 231 to transmit the message to another device. The transmitter 231 transmits the message and the receiver 233 receives a message from another device, under the control of the controller 210.

Figure 3:
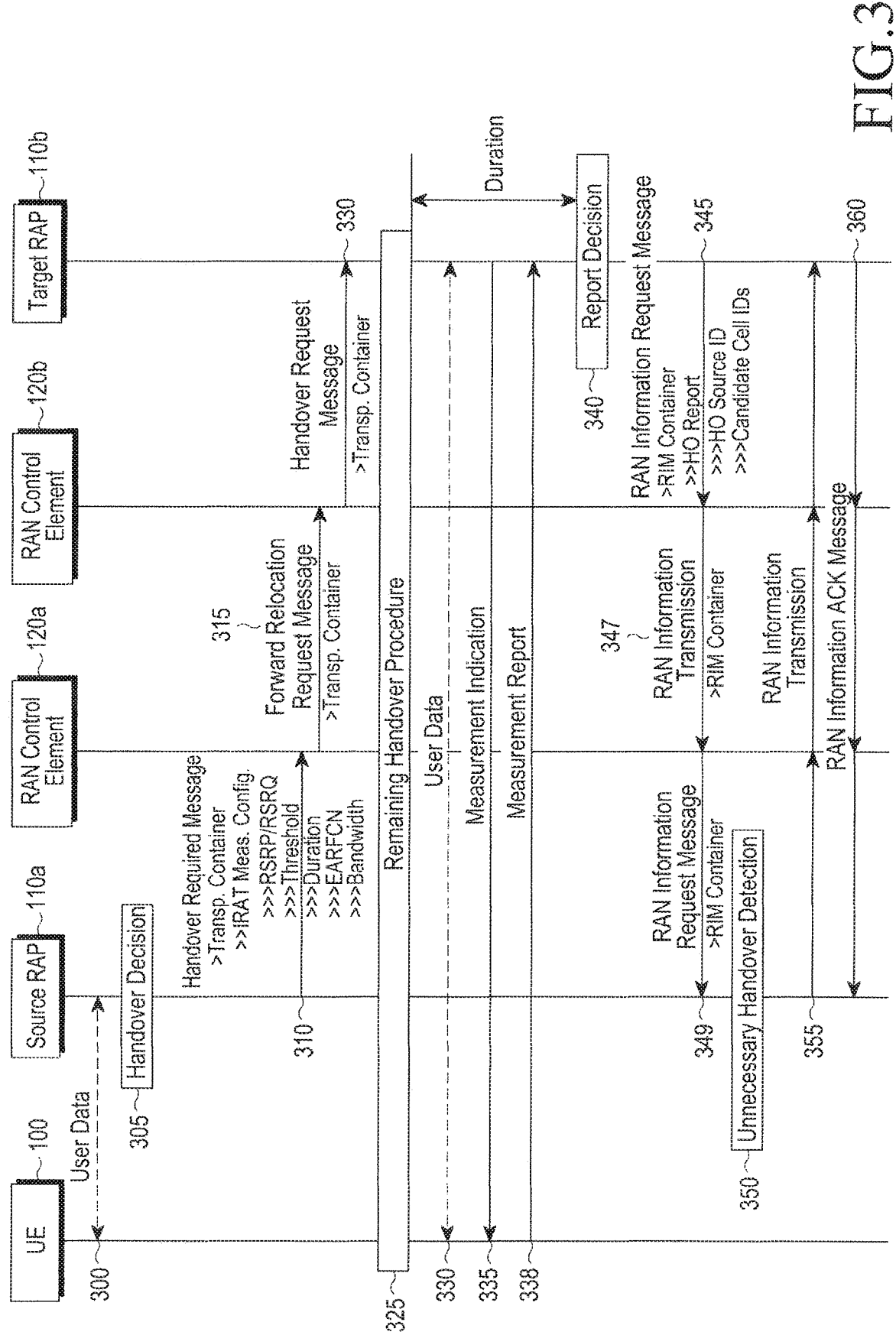
FIG. 3 is a diagram illustrating a signal flow for an operation for sensing an unnecessary inter-Radio Access Network (inter-RAN) handover according to a first embodiment of the present disclosure.

FIG. 3 is a diagram illustrating a signal flow for an operation for sensing an unnecessary inter-RAN handover according to a first embodiment of the present disclosure.

According to the first embodiment of the present disclosure, when a handover occurs between the different RANs 113a and 113b, the RAP 110a transmits routing information about the RAN 113a to the RAP 110b of the RAN 113b so that if the RAP 110b senses a specific condition, the RAP 110b may transmit corresponding information to the RAP 110a of the RAN 113a. Herein, the RAP 110a is referred to as a source RAP 110a, the RAP 110b is referred to as a target RAP 110b, the RAN 113a including the source RAP 110a is referred to as a source RAN 113a, and the RAN 113b including the target RAP 110b is referred to as a target RAN 113b.

Referring to FIG. 3, the UE 100 may receive user data (that is, a service) from the source RAP 110a in step 300. In the first embodiment of the present disclosure, when it is said that the UE 100 receives a service from the RAPs 110a and 110b, this means that there are a context for the UE 100 in the RAPs 110a and 110b and the UE 100 exchanges user data and signaling with the RAPs 110a and 110b.

If the source RAP 110a determines that it is appropriate for the UE 100 to receive a service from the target RAN 113b, more specifically to receive user data from the target RAP 110b of the target RAN 113b, the source RAP 110a determines a handover of the UE 100 to the target RAN 113b in step 305.

In step 310, the source RAP 110a transmits a message requesting preparation for a handover to the RAN control element 120a. The message requesting preparation for a handover may be a Handover Required message. The Handover Required message may include a transparent container transmitted to the target RAP 110b transparently (the intermediate RAN control elements 120a and 120b do not need to interpret or are not supposed to interpret the transparent container). The transparent container included in the Handover Required message may include at least one of routing information about the source RAP 110a, a measurement quantity related to the source RAN 113a, a reporting threshold used in analyzing the measurement result of the measurement quantity, a duration over which the target RAP 110b should collect a measurement result from the UE 100 after a successful inter-RAN handover, and a measurement frequency bandwidth.

The routing information about the source RAP 110a may include at least one of a Tracking Area Identity (TAI), a global eNB ID, and an E-UTRAN Cell Global Identity (ECGI). Upon receipt of both the global eNB ID and the ECGI, the target RAP 110b is naturally aware of the TAI, global eNB ID, and ECGI of the source RAP 110a.

Aside from the above scheme, a more efficient transmission scheme for indicating the global eNB ID and ECGI of the source RAP 110a to the target RAP 110b may be contemplated, based on the idea that the ECGI and global eNB ID of a home eNB are identical and the global eNB ID of any other eNB is a part of its ECGI.

The source RAP 110a transmits only the ECGI without the global eNB ID. In addition, the source RAP 110a transmits an indicator indicating whether it is a home eNB or not (the indicator may indicate whether the source RAP 110a is a home eNB, may be transmitted only when the source RAP 110a is a home eNB, may indicate whether the source RAP 110a is a general eNB, or may be transmitted only when the source RAP 110a is a general eNB). If the source RAP 110a is not a home eNB, the target RAP 110b extracts the global eNB ID from the ECGI (by removing the last eight bits of the ECGI). If the source RAP 110a is a home eNB, the target RAP 110b sets the global eNB ID to the ECGI.

If the source RAP 110a is a home eNB, the source RAP 110a transmits only the ECGI without the global eNB ID. Otherwise, the source RAP 110a transmits both the global eNB ID and the ECGI. Upon receipt of the ECGI only, the target RAP 110b extracts the global eNB ID from the ECGI (by removing the last eight bits of the ECGI). If the source RAP 110a is a home eNB, the target RAP 110b does not need to extract the global eNB ID.

The source RAP 110a transmits only the ECGI. The target RAP 110b determines whether the source RAP 110a is a home eNB using configuration information preserved in the target RAP 110b. If the source RAP 110a is not a home eNB, the target RAP 110b extracts the global eNB ID from the ECGI (by removing the last eight bits of the ECGI). If the source RAP 110a is a home eNB, the target RAP 110b sets the global eNB ID to the ECGI.

An operation to be performed when the target RAP 110b is aware of the TAI, global eNB ID, and ECGI of the source RAP 110a in the above-described method will be described in detail with reference to step 340.

At least one of the above-described TAI, global eNB ID, ECGI, and indicator indicating whether the RAP 110a is a home eNB may be transmitted in a transparent container (a source BSS to target BSS transparent container and/or old BSS to new BSS information) in many manners:

transmitted in an IRAT Measurement Configuration Information Element (IE) of the transparent container; and
transmitted in a separate (new) IE (for example, a UE History Information IE) other than the IRAT Measurement Configuration IE in the transparent container.

[Table 3] below illustrates an exemplary configuration of the IRAT Measurement Configuration IE, when all of the TAI, the global eNB ID, and the ECG are transmitted in the IRAT Measurement Configuration IE of the transparent container. The TAI, the global eNB ID, and the ECG may be arranged appropriately, in consideration of a TAI length of 40 bits, a global eNB ID length of 20 bits for a general eNB and 28 bits for a home eNB, and an ECGI length of 28 bits.

TABLE 3

| | 8 | 7 | 6 | 5 | 4 | 3 | 2 | 1 |
|---|---|---|---|---|---|---|---|---|
| Octet 1 | IEI | | | | | | | |
| Octet 2 | Length Indicator | | | | | | | |
| Octet 3 | pare | REP_QUANT | REPORTING_THRESHOLD | | | | | |
| Octet 4 | Measurement_Duration | | | | | | | |
| Octets 5-6 | E-ARFCN | | | | | | | |
| Octet 7 | Spare | | | | | Measurement Bandwidth | | |
| Octets 8-9 | E-ARFCN | | | | | | | |
| Octet 10 | Spare | | | | | Measurement Bandwidth | | |
| " | " | | | | | | | |
| Octets m-(m + 1) | E-ARFCN | | | | | | | |
| Octet m + 2 | Spare | | | | | Measurement Bandwidth | | |
| Octets m + 3-m + 7 | Octets 4 to 8 contain the value part (starting with octet 2) of the Tracking Area Identity IE defined in 3GPP TS 24.301 [37], not including 3GPP TS 24.301 IEI [37] | | | | | | | |
| Octets m + 8-n | Global eNB ID | | | | | | | |
| Octets n + 1-n + 7 | E-UTRAN CGI | | | | | | | |

The RAN control element 120a transmits a message to the RAN control element 120b of the target RAN 113b in step 315. The message may be a Forward Relocation Request message. The Forward Relocation Request message may include at least one of a transparent container and routing information about the source RAP 110a. Once the RAN control element 120a transmits the routing information about the source RAP 110a, the routing information about the source RAP 110a may be transmitted to the target RAP 113b even though the transparent container does not include the routing information about the source RAP 110a in step 310. As described before, the RAN control element 120 preserves the routing information about the RAP 110 of the UE 100 because the RAN control element 120 is responsible for overall control of the mobility of the UE 100.

The RAN control element 120b may transmit a Hanover Required message to the target RAP 110b in step 320. The Handover Required message may be a PS-HANDOVER-REQUEST message or a Handover Request message. The Hanover Required message may include at least one of a transparent container (a source BSS to target BSS transparent container and/or old BSS to new BSS information) and the routing information about the source RAP 110a.

The routing information about the source RAP 110a may be transmitted without using a transparent container in steps 315 and 320 in at least one of the methods for determining the global eNB ID and ECGI of the source RAP 110a by the target RAP 110b, described before with reference to step 310. The TAI may be apparently transmitted. The method for transmitting the routing information about the source RAP 110a in a transparent container as described in step 310 is different, just in terms of a transmission medium, from the method for transmitting the routing information about the source RAP 110a in IEs of the two messages transmitted in steps 315 and 320, not in a transparent container. It is to be clearly understood that the method for more efficiently indicating the global eNB ID and ECGI of the source RAP 110a to the target RAP 110b is applicable to the method for transmitting the routing information about the source RAP 110a in IEs of the two messages transmitted in steps 315 and 320, not in a transparent container.

The remaining handover procedure may be performed in step 325. Then, the UE 100 may receive a service from the target RAP 110b in step 330. During the handover, the UE 100 may transmit routing information about the source RAN 110a. The routing information about the source RAN 110a may be transmitted in a Handover Access message. The routing information about the source RAN 110a may be carried in a Handover Reference Information IE of the message. The Handover Reference Information IE may not carry the TAI, the ECGI, and/or the global eNB ID due to its limited size. In this case, the UE 100 may indicate the source RAP 110a using a Physical Cell Identifier (PCI, the PCI is shorter) of a cell within the source RAP 110a, and the RAP 110b may acquire the routing information about the source RAP 110a using configuration information preserved in the RAP 110b.

Referring to FIG. 3 again, the target RAP 110b may instruct the UE 100 to continuously measure about the source RAN 113a, based on the received information in step 335. The measurement target may be determined based on at least one of the measurement quantity related to the RAN 113a and the measurement frequency/bandwidth received in the transparent container. The UE 100 may perform a measurement as instructed by the target RAP 110b and transmit a report of the measurement to the target RAP 110b periodically or intermittently in step 338.

Upon expiration of the duration set in the transparent container, the target RAP 110b may determine whether all measurement results of one or more cells within a predetermined time exceed a threshold by comparing the measurement report received from the UE 100 with the threshold received in the transparent container. If all measurement results of at least one cell exceed the threshold, this may imply that the UE 100 has performed an unnecessary handover to the target RAP 113b even though the UE 100 may receive a service sufficiently from a cell of the source RAN 113. Upon sensing the unnecessary inter-RAN handover, the target RAP 110b may determine to indicate the unnecessary handover to the source RAN 113a in step 340.

The target RAP 110b transmits a message carrying RAN Information Management (RIM) information to the source RAP 110a through the RAN control elements 120a and 120b in steps 345, 347, and 349. The message carrying the RIM information may be a RAN Information Request message. The RAN Information Request message may include a RIM container and, in addition, routing information about a destination of the RIM container.

The RIM container may include information (an HO Report) helpful for the source RAP 110a to recognize and solve the problem (i.e., the unnecessary handover). The information (the HO Report) may include at least one of an HO type indicating LTE to UTRAN or LTE to GERAN, an HO report type indicating report of an unnecessary handover to another RAN, an HO source ID (a cell ID within the RAP 110a), an HO target ID (a cell ID within the RAP 110b), and a candidate cell list (listing cells having all measurement results exceeding a threshold during a time period). Among them, the HO source ID may indicate the ECGI of a source cell in the source RAP 110a. The destination of the RIM container may be the source RAP 110a. Routing information about the RIM container destination may include at least one of a TAI and a global eNB ID. Accordingly, the target RAP 110b may need the TAI, global eNB ID, and ECGI of the source RAP 110a. The target RAP 110b may determine the TAI, global eNB, and ECGI of the source RAP 110a by at least one of the method for transmitting the routing information about the source RAP 110a in a transparent container, described before in relation to step 310; and the method for transmitting the routing information about the source RAP 110a by a PS-Handover-Request message and a Handover Request message, described before in relation to step 321, may fill the HO source ID based on the determined ECGI, and may fill the routing information about the RIM container destination based on the determined TAI and global eNB ID.

The RIM container may be transmitted to the source RAP 110a through the RAN control elements 120b and 120a in steps 347 and 349. The RAN control element 120b may select the RAN control element 120a using the routing information about the RIM container destination received from the RAP 110b, that is, the TAI and/or the global eNB ID. Further, the RAN control element 120a may receive the TAI and/or the global eNB ID from the RAN control element 120b, detect the appropriate RAP 110a, and transmit the RIM container to the RAP 110a.

Upon receipt of the RIM container, the source RAP 110a may amend a mobility setting, determining that an unnecessary handover has occurred in step 350.

The source RAP 110a transmits RAN information to the target RAP 110b through the RAN control elements 120a and 120b in response to the RIM container in step 355. The target RAP 110b transmits a RAN information ACKnowledgment (ACK) message to the source RAP 110a through the RAN control elements 120a and 120b in step 360.

It is to be clearly understood that the method for transmitting routing information according to the embodiment of the present disclosure is not necessarily for sensing an unnecessary handover but may be modified partially or wholly whenever there is a need for transmitting routing information.

Figure 4:
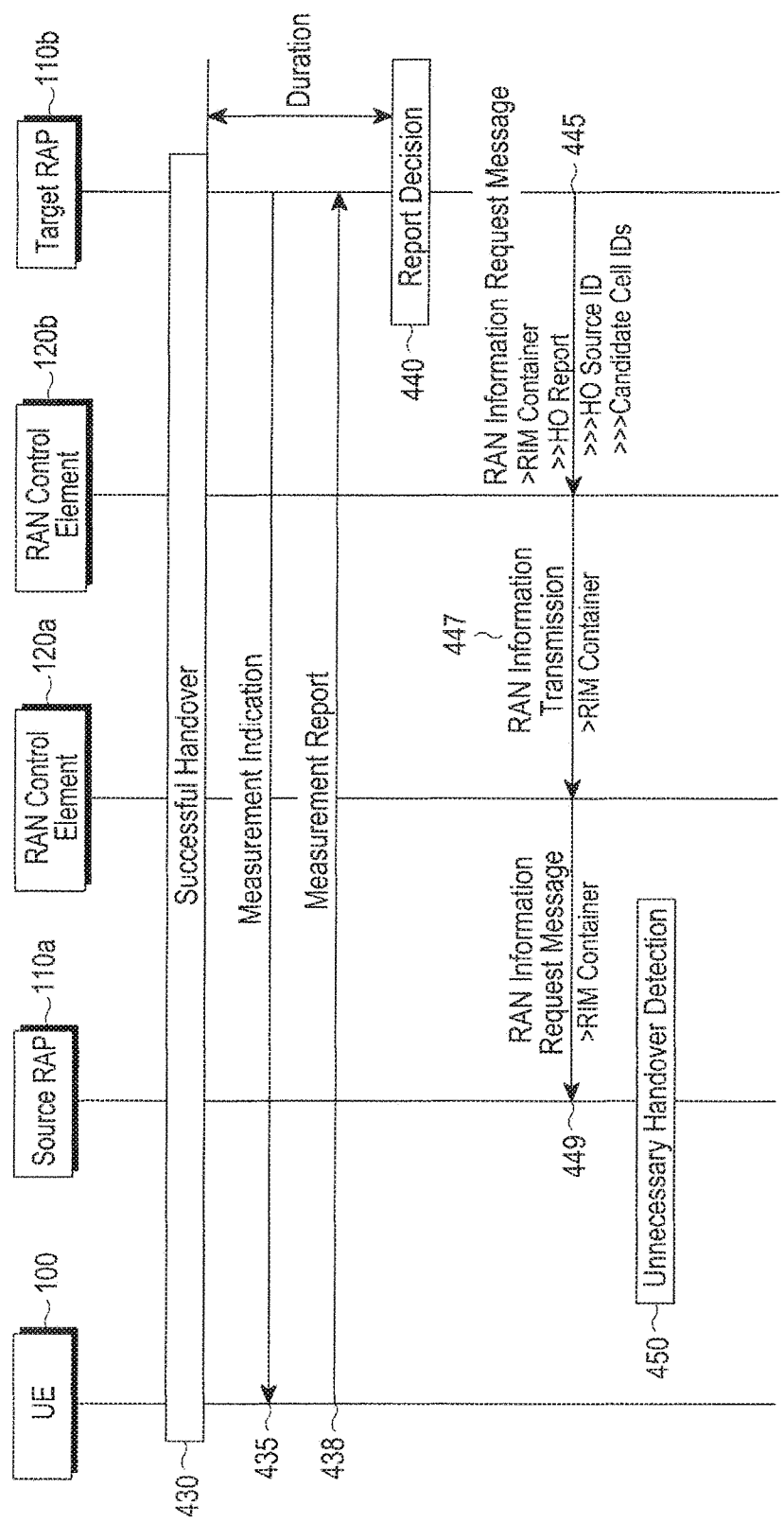
FIG. 4 is a diagram illustrating a signal flow for an operation for sensing an unnecessary inter-RAN handover according to a second embodiment of the present disclosure.

FIG. 4 is a diagram illustrating a signal flow for an operation for sensing an unnecessary inter-RAN handover according to a second embodiment of the present disclosure.

According to the second embodiment of the present disclosure, even though the source RAP 110a does not transmit routing information about the source RAP 110a to the target RAP 110b, the target RAP 110b may infer the routing information about the source RAP 110a based on an initial measurement result after a handover from the source RAP 110a to the target RAP 110b.

The handover from the source RAP 110a to the target RAP 110b may be performed successfully in step 430. The second embodiment of the present disclosure may correspond to all or part of steps 300 to 330 in the first embodiment of the present disclosure.

The target RAP 110b transmits measurement information instructing a measurement to the UE 100 in step 435 and the UE 100 transmits a measurement report to the target RAP 110b in step 438. The target RAP 110b may receive one or more measurement reports during a time period indicated in step 430 and may recognize occurrence of an unnecessary handover based on the measurement report.

Upon sensing occurrence of the unnecessary handover, the target RAP 110b determines to notify the source RAP 110a of the unnecessary handover in step 440. The unnecessary handover may be notified to the source RAP 110a in messages transmitted in steps 445, 447, and 449. The message transmitted in step 445 may include a RIM container and/or routing information about a RIM container destination. The RIM container may need to include the ECGI of a source cell within the RAP 110a, and the routing information about the RIM container destination may include the TAI and global eNB ID of the source RAP 110a.

The target RAP 110b may infer at least one of the TAI, global eNB ID, and ECGI of the source RAP 110a using a measurement report received from the UE 100 and/or configuration information preserved in the RAP 110b. For example, the target RAP 110b may identify a cell having a largest signal strength from an initial measurement report received after the handover, infer at least one of the TAI, the global eNB ID, and the ECGI of the source RAP 110a using configuration information about the identified cell, and perform the next step, assuming that the inferred information is information about a source cell within the source RAP 110a.

A more simple method for determining a source cell is to depend only on the configuration information preserved in the RAP 110b. If the RAP 110a is unusually deployed around the RAP 110b, the source cell may be accurately determined just using the configuration information. In another example, an adjacent cell of the RAN 113a may be selected randomly and determined to be the source cell. The source cell may be determined using two or more of the above-described determination methods in combination.

The target RAP 110b may fill a part of the RIM container and the routing information about the RIM container destination using the inferred at least one of the TAI, the global eNB ID, and the ECGI in step 445. Step 445 and the subsequent steps may be performed similarly to step 345 and the subsequent steps in the first embodiment of the present disclosure and thus will not be described herein in detail.

Figure 5:
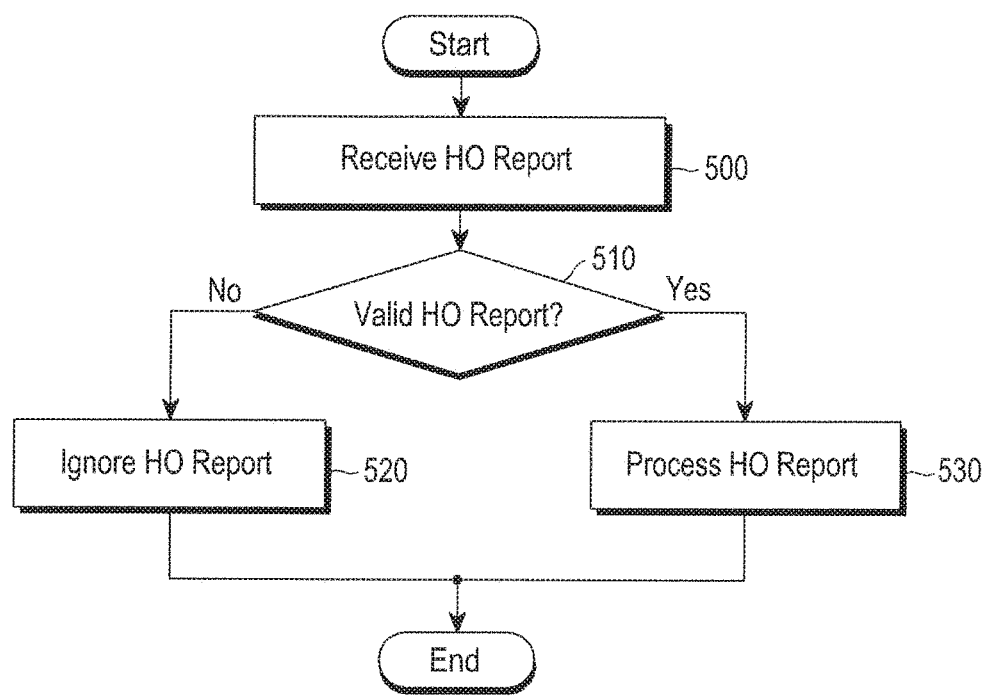
FIG. 5 is a flowchart illustrating an operation of a Radio Access Point (RAP) when the RAP receives an HO Report message according to an embodiment of the present disclosure.

FIG. 5 is a flowchart illustrating an operation of a RAP when the RAP receives an HO Report message according to an embodiment of the present disclosure.

According to the embodiment of the present disclosure, even though a HO Report is transmitted to a RAP other than the RAP 110a including a cell (a source cell of an unnecessary handover) that is supposed to receive the HO Report, the HO Report may be verified. If the HO Report is not valid, the HO Report may be ignored, thereby preventing unnecessary adjustment of a mobility setting.

If routing information about a source cell within the source RAP 110a is transmitted as in the first embodiment, the HO Report may be transmitted to the right RAP 110a, that is, the RAP 110a that has incurred the unnecessary handover. On the other hand, if the routing information about the source cell within the source RAP 110a is not transmitted and the source RAP 110a is inferred as in the second embodiment, the HO Report may be transmitted to a RAP other than the RAP 110a that has incurred the unnecessary handover. If the HO Report is transmitted to the wrong RAP and manipulates a well-set mobility setting of the RAP 110, network performance may be adversely affected. Therefore, the RAP receiving the HO Report may need a procedure as illustrated in FIG. 5 to verify the HO Report.

Referring to FIG. 5, a RAP receives an HO Report in step 500. The RAP verifies the HO Report in step 510. The HOR Report may be verified in various manners depending on implementation. For example, there may be a value frequently set as a duration included in a transparent container of a Handover Required message, for each RAP. Upon receipt of a HO Report, a RAP determines whether it has performed a handover to a HO target ID set in the HO Report before a time corresponding to the value frequently set in the duration (+margin). If the RAP has performed a handover, the RAP may determine that the HO Report is valid and otherwise, the RAP may determine that the HO Report is not valid. The margin may be set in consideration of a transmission delay and a processing delay. In another example, when the target RAP 110b transmits a HO Report, it may include the whole or part of the contents of an IRAT Measurement Configuration received from the source RAP 110a during the handover. Upon receipt of the HO Report including the whole or part of the contents of the IRAT Measurement Configuration, the RAP determines whether the received IRAT Measurement Configuration is an IRAT Measurement Configuration frequently set by the RAP. If the IRAT Measurement Configurations are identical, the RAP may determine that the HO Report is valid and otherwise, the RAP may determine that the HO Report is not valid.

If the RAP determines that the HO Report is valid, the RAP processes the HO Report in step 520. For example, if the RAP has received HO Reports that may be classified into the same HO Report a predetermined number of or more times or as often as or more often than a predetermined time interval, the RAP may reflect the HO Reports in a mobility setting.

If the RAP determines that the HO Report is not valid, the RAP ignores the HO Report in step 530.

Now, a description will be given of third and fourth embodiments for sensing an unnecessary handover and thus adjusting a mobility setting by the source RAP 110a with reference to FIGS. 6 and 7.

Figure 6:
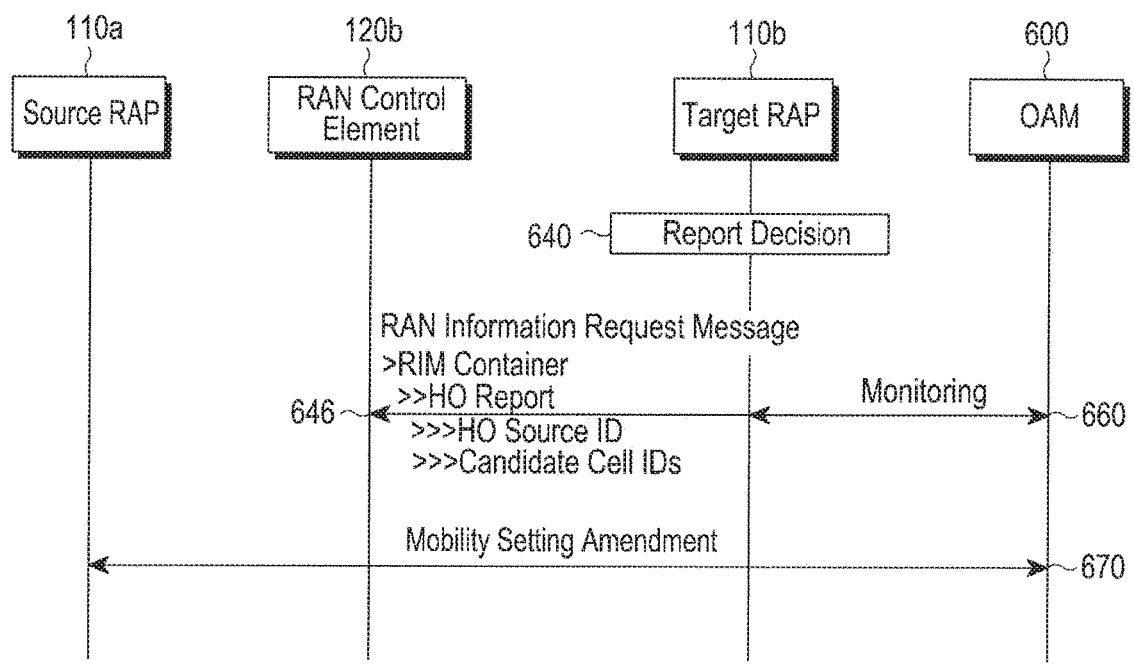
FIG. 6 is a diagram illustrating a signal flow for an operation for adjusting a mobility setting by sensing an unnecessary handover at a source RAP 110a according to a third embodiment of the present disclosure.

FIG. 6 is a diagram illustrating a signal flow for an operation for adjusting a mobility setting by sensing an unnecessary handover at the source RAP 110a according to a third embodiment of the present disclosure.

According to the third embodiment of the present disclosure, an Operation, Administration, and Maintenance (OAM) may monitor the RAP 110b continuously. If the RAP 110b transmits a HO Report more frequently, and/or if the number of transmissions of a HO Report exceeds a predetermined number, the OAM may detect the RAP 110a and induce the RAP 110a to amend a mobility setting.

Once the target RAP 110b senses an unnecessary handover and determines to notify the source RAP 110a of the unnecessary handover, the target RAP 110b may transmit a message to the RAN control element 120b by containing a HO Report in a RIM container in step 645. An OAM 600 continuously monitors RAPs in step 660. If the OAM 600 senses the message frequently or a predetermined number of or more times, the OAM 600 detects the problematic RAP 110a and induces the RAP 110a to amend a mobility setting, determining that there is a problem with the mobility setting of the RAP 110a in step 670.

Figure 7:
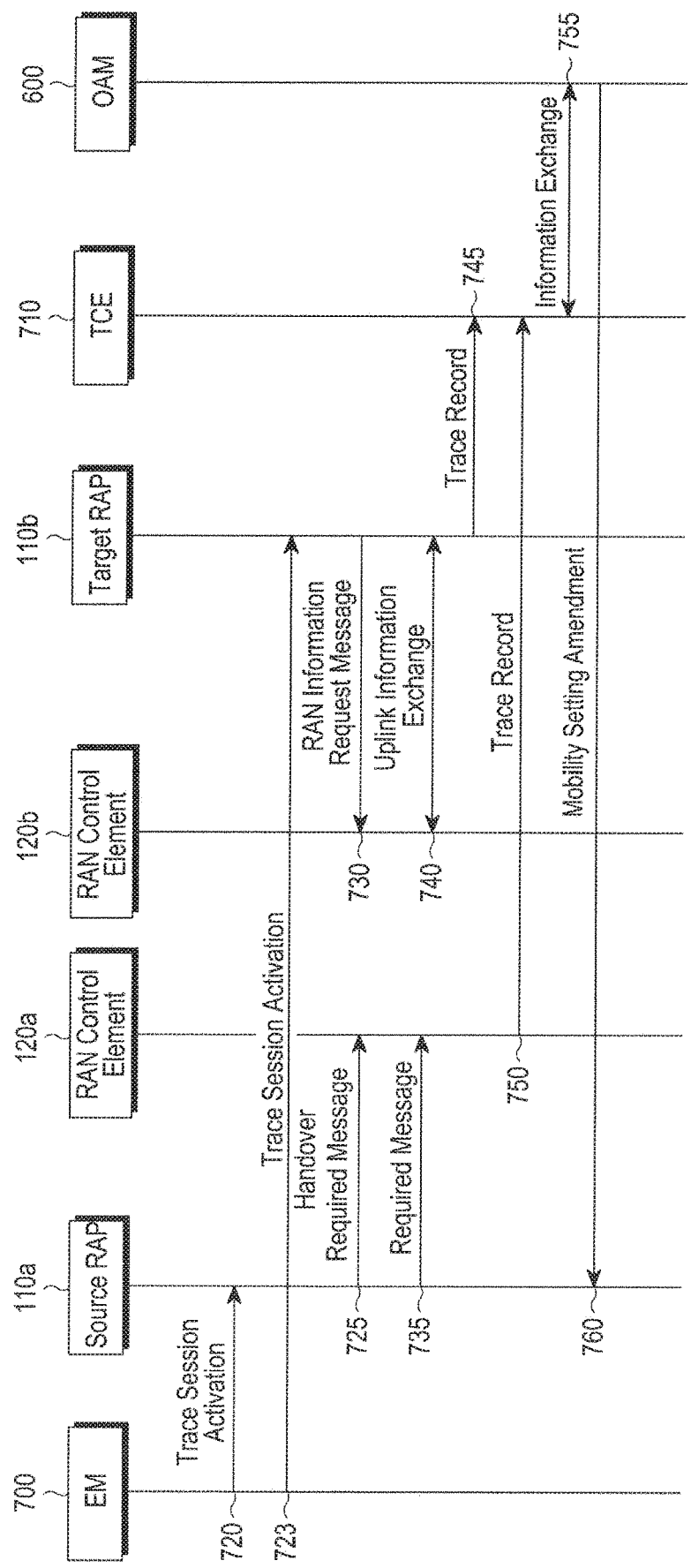
FIG. 7 is a diagram illustrating a signal flow for an operation for adjusting a mobility setting by sensing an unnecessary handover using a trace function at the source RAP 110a according to an embodiment of the present disclosure.

FIG. 7 is a diagram illustrating a signal flow for an operation for adjusting a mobility setting by sensing an unnecessary handover using a trace function at the source RAP 110a according to a fourth embodiment of the present disclosure.

According to the embodiment of the present disclosure, a Trace Collection Entity (TCE) 710 may sense an unnecessary handover and induce amendment in a mobility setting.

An Element Manager (EM) 700 may configure the source RAP 110a and/or the target RAP 110b to report a specific event, upon occurrence of the specific event in steps 720 and 723. For example, the source RAP 110a may be configured to report transmission of an IRAT Measurement Configuration IE to the TCE (through another entity), when it transmits the IRAT Measurement Configuration IE (to speak more generally, when it transmits additional information for sensing an unnecessary handover), and the target RAP 110b may be configured to report transmission of a HO Report to the TCE (through another entity), when it transmits the HO Report. The EM 700 may transmit information about the configurations to the RAPs 110a and 110b, not directly but through a few other entities.

When a Handover Required message including an IRAT Measurement Configuration IE is transmitted in step 725 or when a RAN Information Request message including a HO Report is transmitted in step 730, information about the event may be transmitted to the TCE 710 in steps 735/750 and 740/745).

In the absence of detailed information (for example, an IMSI) about the UE in the RAP 110a, the RAP 110a may transmit report information about the event to the TCE 710 through the RAN control element 120a in steps 735 and 750. At least one of a message transmitted from the RAP 110a to the RAN control element 120a and a message transmitted from the RAN control element 120a to the TCE 710 may include a part of a IRATMeasurement Configuration IE or a IRATMeasurement Configuration IE.

In the presence of the detailed information (for example, the IMSI) about the UE in the RAP 110b, the RAP 110b may exchange information with the RAN control element 120b, for acquisition of additional information (for example, an IMEI(SV)) in step 740, or may transmit report information about the event directly to the TCE 710 without the information exchange in step 745. Herein, the information transmitted from the RAP 110b to the TCE 710 may include a HO Report or its part.

The TCE 710, which has collected the information, may sense occurrence of an unnecessary handover in conjunction with the OAM 600 in step 755. Upon sensing an unnecessary handover, the TCE 710 determines that there is a problem with a mobility setting of the RAP 110a, detects the RAP 110a, and induces the RAP 110a to amend the mobility setting in step 760.

In the foregoing embodiments, any of the steps and messages may be selective or omitted. In each embodiment, the steps may not be performed always in a predetermined order and thus their sequence may be changed. Messages may not be transmitted always in a predetermined order and thus their delivery sequence may be changed. Each step and each message may be implemented independently.

The whole or a part of the tables given as examples in the foregoing embodiments is presented to help the understanding of the present disclosure. Therefore, details of the tables may be considered to be a representation of a part of the method and apparatus proposed by the present disclosure. In other words, a semantic approach may be preferred to a communicative approach to the contents of the tables.

While the disclosure has been shown and described with reference to certain exemplary embodiments thereof, it will be understood by those skilled in the art that various changes in form and details may be made therein without departing from the spirit and scope of the disclosure as defined by the appended claims and their equivalents.

What is claimed is:

1. A method of a first base station in a wireless communication system, the method comprising:
   transmitting, by the first base station to a second base station, a message requesting an inter-radio access technology (RAT) handover from a cell of the first base station to a cell of the second base station, the message including inter-RAT measurement configuration information, a tracking area identity (TAI), an identifier of the first base station, and an identifier of the cell of the first base station; and
   receiving, by the first base station from the second base station, a handover report indicating that the inter-RAT handover is unnecessary after the inter-RAT handover to the second base station is performed successfully, the handover report including the identifier of the cell of the first base station,
   wherein the inter-RAT measurement configuration information includes information on a duration in which the second base station is to collect measurement results and information on a frequency for which the second base station collects the measurement results, and
   wherein the measurement results are received from a user equipment (UE) by instructing the UE to measure the frequency.

2. The method of claim 1, wherein the handover report further includes at least one of a handover type, a handover report type, a handover target ID, or a candidate cell list.

3. The method of claim 1, wherein the identifier of the cell of the first base station includes an evolved-universal mobile telecommunication system terrestrial radio access network (E-UTRAN) cell global identifier (ECGI).

4. The method of claim 1, wherein it is determined that the handover is unnecessary when the duration expires.

5. A method of a second base station in a wireless communication system, the method comprising:
   receiving, from a first base station, a message requesting an inter-radio access technology (RAT) handover from a cell of the first base station to a cell of the second base station, the message including inter-RAT measurement configuration information, a tracking area identity (TAI), an identifier of the first base station, and an identifier of the cell of the first base station, the inter-RAT measurement configuration information includes information on a duration in which the second base station is to collect measurement results and information on a frequency for which the second base station collects the measurement results;
   receiving measurements results of the frequency for the duration of collecting the measurements results by instructing a user equipment (UE) to measure the frequency after the inter-RAT handover to the second base station is performed successfully;
   identifying that the inter-RAT handover is unnecessary based on the collected measurements results; and
   transmitting, to the first base station, a handover report indicating that the inter-RAT handover is unnecessary, the handover report including the identifier of the cell of the first base station.

6. The method of claim 5, wherein the handover report further includes at least one of a handover type, a handover report type, a handover target ID, or a candidate cell list.

7. The method of claim 5, wherein the identifier of the cell of the first base station includes an evolved-universal mobile telecommunication system terrestrial radio access network (E-UTRAN) cell global identifier (ECGI).

8. The method of claim 5, wherein it is determined that the handover is unnecessary when the duration expires.

9. A first base station in a wireless communication system, the first base station comprising:
   a transceiver configured to transmit and receive a signal; and
   a processor configured to control the transceiver to:
      transmit, to a second base station, a message requesting an inter-radio access technology (RAT) handover from a cell of the first base station to a cell of the second base station, the message including inter-RAT measurement configuration information, a tracking area identity (TAI), an identifier of the first base station, and an identifier of the cell of the first base station, and receive, from the second base station, a handover report indicating that the inter-RAT handover is unnecessary after the inter-RAT handover to the second base station is performed successfully, the handover report including the identifier of the cell of the first base station, wherein the inter-RAT measurement configuration information includes information on a duration in which the second base station is to collect measurement results and information on a frequency for which the second base station collects the measurement results, and wherein the measurement results are received from a user equipment (UE) by instructing the UE to measure the frequency.

10. The first base station of claim 9, wherein the handover report further includes at least one of a handover type, a handover report type, a handover target ID, or a candidate cell list.

11. The first base station of claim 9, wherein the identifier of the cell of the first base station includes an evolved-universal mobile telecommunication system terrestrial radio access network (E-UTRAN) cell global identifier (ECGI).

12. The first base station of claim 9, wherein it is determined that the handover is unnecessary when the duration expires.

13. A second base station in a wireless communication system, the second base station comprising:
a transceiver configured to transmit and receive a signal; and
a processor configured to:
control the transceiver to receive, from a first base station, a message requesting an inter-radio access technology (RAT) handover from a cell of the first base station to a cell of the second base station, the message including inter-RAT measurement configuration information, a tracking area identity (TAI), an identifier of the first base station, and an identifier of the cell of the first base station, the inter-RAT measurement configuration information includes information on a duration in which the second base station is to collect measurement results and information on a frequency for which the second base station collects the measurement results, control the transceiver to receive measurements results of the frequency for the duration of collecting the measurements results by instructing a user equipment (UE) to measure the frequency after the inter-RAT handover to the second base station is performed successfully, identify that the inter-RAT handover is unnecessary based on the measurements results, and control the transceiver to transmit, to the first base station, a handover report indicating that the inter-RAT handover is unnecessary, the handover report including the identifier of the cell of the first base station.

14. The second base station of claim 13, wherein the handover report further includes at least one of a handover type, a handover report type, a handover target ID, or a candidate cell list.

15. The second base station of claim 13, wherein the identifier of the cell of the first base station includes an evolved-universal mobile telecommunication system terrestrial radio access network (E-UTRAN) cell global identifier (ECGI).

16. The second base station of claim 13, wherein it is determined that the handover is unnecessary when the duration expires.

* * * * *